United States Patent

Iwata et al.

[11] Patent Number: 5,831,165
[45] Date of Patent: Nov. 3, 1998

[54] ACCELERATION SENSOR

[75] Inventors: Hitoshi Iwata; Katsuya Kogiso; Kenichi Kinoshita, all of Aichi-ken, Japan

[73] Assignee: Kabushiki Kaisha Tokai Rika Denki Seisakusho, Japan

[21] Appl. No.: 737,835

[22] PCT Filed: May 24, 1995

[86] PCT No.: PCT/JP95/00994

§ 371 Date: Nov. 21, 1996

§ 102(e) Date: Nov. 21, 1996

[87] PCT Pub. No.: WO95/33209

PCT Pub. Date: Dec. 7, 1995

[30] Foreign Application Priority Data

May 27, 1994 [JP] Japan .................................. 6-115440

[51] Int. Cl.$^6$ .................................................. G01P 15/00
[52] U.S. Cl. .................... 73/514.11; D73/514.09; D73/862.581; D73/514.33; D73/715; D73/720; D73/726; 338/2; 338/4
[58] Field of Search ........................... 73/514.01, 514.05, 73/514.06, 514.09, 514.11, 514.16, 514.33, 514.34, 700, 706, 715, 716, 717, 778, 779, 720, 721, 723, 724, 725, 726, 727, 862.581; 338/2, 4; 257/415, 417

[56] References Cited

U.S. PATENT DOCUMENTS 5,461,922  10/1995  Koen .................................... 73/756
5,509,308   4/1996  Iwata et al. ...................... 73/514.09

FOREIGN PATENT DOCUMENTS

1-245163   9/1989  Japan .......................... G01P 15/02
1-253656  10/1989  Japan .......................... G01P 15/09

*Primary Examiner*—Hezron E. Williams
*Assistant Examiner*—Richard A. Moller
*Attorney, Agent, or Firm*—Limbach & Limbach L.L.P.

[57] ABSTRACT

An acceleration sensor (1) includes a parallelepiped case (2). A circuit board (3) is secured in the case (2). A sensor chip (5), on which a diffusion strain gauge (5b) is formed, is mounted on the circuit board (3). A cylindrical acceleration selecting element (13) is provided on the case (2). The axis of the acceleration selecting element (13) extends in the x direction. A cylindrical pressure transmitting element (14) is also provided on the case (2). The pressure transmitting element (14) communicates a hollowed part on the top of the sensor chip (5) with the interior of the acceleration selecting element (13). The hollowed part on the top of the sensor chip (5), the pressure transmitting element (14) and the acceleration selecting element (13) are filled with silicon gel (10).

13 Claims, 9 Drawing Sheets

ACCELERATION SENSOR

BACKGROUND OF THE INVENTION

1. Field of the Invention

The present invention relates to an acceleration sensor that detects an acceleration of an object to which the sensor is attached based on pressure changes caused by the inertia of the medium filling the sensor.

2. Description of the Related Art

Figure 16:
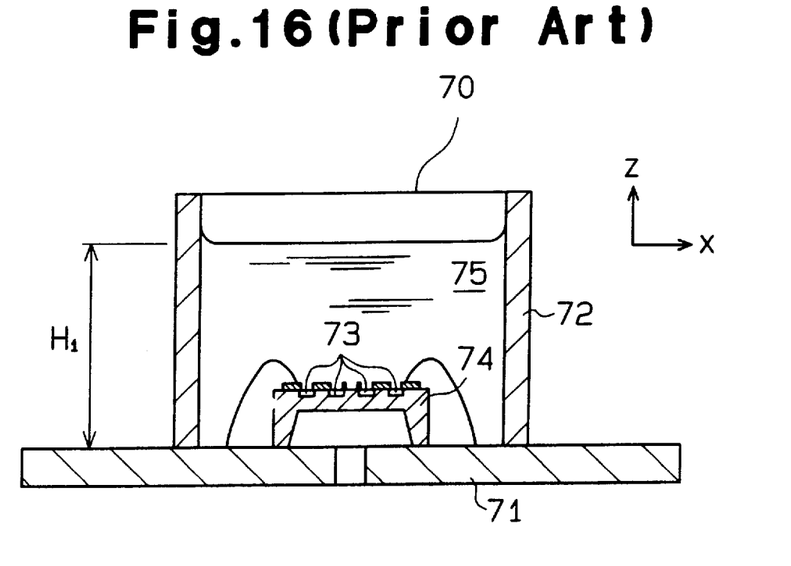
FIG. 16 is a cross-sectional view of a conventional acceleration sensor.

There have been proposed various types of acceleration sensors for detecting the acceleration of an object to which the sensor is attached by detecting pressure changes. An acceleration sensor 70 illustrated in FIG. 16 is an example of such a sensor. The acceleration sensor 70 includes a cylindrical sensor mount 72 mounted on a circuit board 71. A diaphragm type semiconductor pressure sensitive sensor chip (hereinafter simply referred to as a sensor chip), on which diffusion gauges 73 are formed, is provided in the sensor mount 72. Silicon gel 75 having a required density fills the interior of the sensor mount 72 to cover the sensor chip 74. In the acceleration sensor 70 having the above structure, acceleration of an object to which the sensor 70 is attached causes the silicon gel 75 to fluctuate in response to the acceleration. The pressure caused by the fluctuation of the silicon gel 75 is transmitted to the sensor chip 74 and therefore strains the sensor chip 74. A force is applied to the diffusion strain gauge 73 in accordance with the strain. The diffusion strain gauge 73 then senses the force applied thereto and outputs an electrical signal in accordance with the acceleration as a detection signal. In other words, since the sensor chip 74 is subjected to the pressure of the silicon gel 75, the sensor chip 74 is therefore most susceptible to the pressure caused by acceleration in the vertical direction with respect to the circuit board 71 (direction z in the figures). The principle detectable direction of the acceleration sensor 70 is therefore its vertical direction (direction z in the figures).

Figure 17:
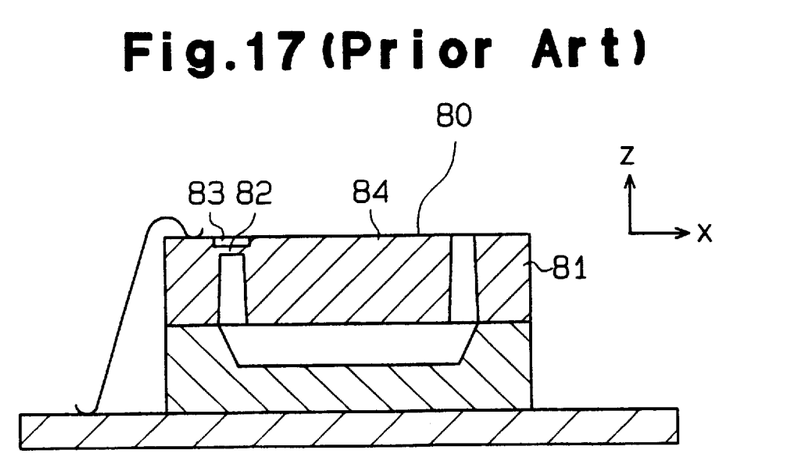
FIG. 17 is a cross-sectional view of a conventional acceleration sensor.

FIG. 17 shows another acceleration sensor 80. In the acceleration sensor 80, a weight portion 84 is attached to a silicon substrate 81 by a cantilever 82. A diffusion strain gauge 83 is provided at the proximal portion of the cantilever 82. The silicon substrate 81 surrounds the weight portion 84 with a predetermined space therebetween. In the acceleration sensor 80 of the above structure, acceleration of an object to which the sensor 80 is attached causes the weight portion 84 to bend in response to the acceleration. This strains the proximal portion of the cantilever 82. A force is applied to the diffusion strain gauge 83 in accordance with the strain. The diffusion strain gauge 83 then senses the force and outputs an electrical signal in accordance with the acceleration as a detection signal. The weight portion 84 therefore bends most when the object and the acceleration sensor 80 are accelerated in the vertical direction with respect to the weight portion 84 (direction z in the figures). This allows a strong detection signal to be produced. The principle detectable direction of the acceleration sensor 80 is therefore its vertical direction (direction z in the figures).

Figure 18:
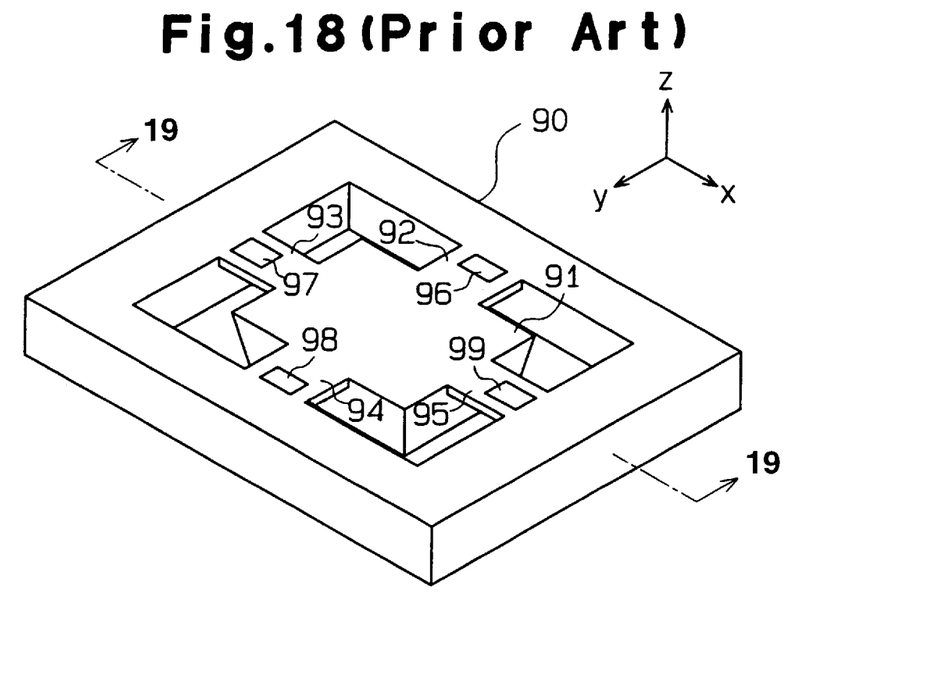
FIG. 18 is a perspective view of a conventional three dimensional acceleration sensor.
Figure 19:
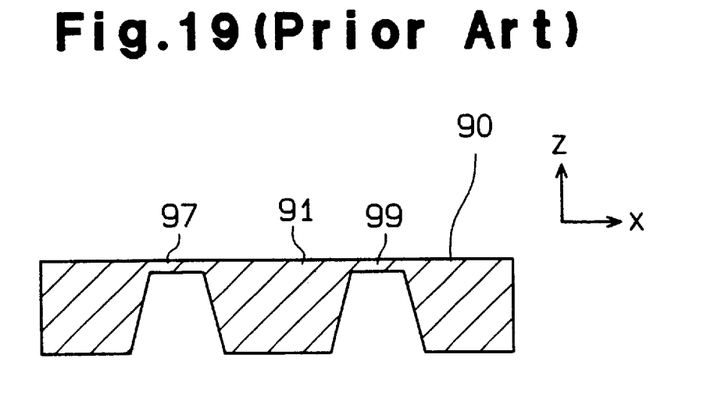
FIG. 19 is a cross sectional view taken along line 19—19 of FIG. 18.

There has been also proposed a three dimensional acceleration sensor for detecting accelerations in a vertical direction (z direction) as well as horizontal directions (x and y directions). FIGS. 18 and 19 show such an acceleration sensor 90. The acceleration sensor 90 has a weight portion 91 having a shape of a truncated pyramid supported by cantilevers 92 to 95. The cantilevers 92 to 95 have diffusion strain gauges 96 to 99 on their top surfaces, respectively. In the acceleration sensor 90 of the above structure, as in the case of the acceleration sensor 80, acceleration of an object to which the sensor 80 is attached causes the weight portion 91 to bend in response to the acceleration. This strains the cantilevers 92 to 95. Force is applied to the diffusion strain gauges 96 to 99 in accordance with the strain. The diffusion strain gauges 96 to 99 then sense the force applied thereto and issue detection signals in accordance with the acceleration of the object and the acceleration sensor 90, respectively.

Japanese Unexamined Patent Publication 1-245163 discloses another acceleration detection device. The acceleration detection device has an elastic plate and a weight portion fixed to the central portion of the plate. The weight portion extends vertically with respect to the plate. Acceleration of the acceleration detection device causes the weight portion to sway. This strains the elastic plate. A strain detection means provided on the elastic plate detects the strain. An external force detector then detects the acceleration applied to the weight portion.

Japanese Unexamined Patent Publication 1-253656 discloses another acceleration sensor. This acceleration sensor has an inertia weight portion and a piezo-resistance effect type pressure sensitive part. The weight portion converts accelerations into inertia pressure. The piezo-resistance effect type pressure element detects the stress of a diaphragm, which senses the inertia pressure. The inertia weight portion is constituted by mercury. Acceleration applied to this acceleration sensor is converted to an inertia pressure by the mercury. The pressure detection element detects the inertia pressure for detecting the acceleration.

Incidentally, the above described acceleration sensors 70 and 80 are mainly designed for detecting acceleration in the z direction. Therefore, when detecting acceleration in an arbitrary direction, for example, the x direction, the acceleration sensors 70 and 80 should be mounted in such a manner that the x direction is aligned with the principle detectable direction of the sensors. This limits the ways for mounting the acceleration sensors 70 and 80 and therefore makes mounting the sensors 70 and 80 troublesome.

Due to its complex structure, the manufacturing process of the weight portion 91 of the acceleration sensor 90 is complicated. The large weight portion 91 may continue to fluctuate without any acceleration applied thereto once it starts fluctuating. This results in bad frequency response characteristics. Furthermore, the detection signals from the diffusion strain gauges 96 to 99 should be processed to be transmitted as detection signals corresponding to the x, y and z directions, respectively. This requires a signal processor for processing the detection signals from the diffusion strain gauges 96 to 99. This complicates the circuit structure.

The acceleration sensor disclosed in Japanese Unexamined Patent Publication 1-245163 requires a complicated process for forming the weight portion and attaching it to the elastic body. This increases the manufacturing cost. In the acceleration sensor disclosed in Japanese Unexamined Patent Publication 1-253656, the diaphragms should be directed in the x, y and z directions respectively. This complicates the sensor structure. The mercury must be sealed since it falls when directed downward. Further, since mercury has no damping characteristics, an abrupt acceleration may break the diaphragms.

It is possible to use the above described acceleration sensors 70 and 80 for separately detecting acceleration in x, y and z directions. However, in this case, the acceleration sensors 70 and 80 need to be mounted in alignment with each of the x, y and z directions, respectively. This increases the manufacturing cost, complicates the mounting process and enlarges the size of an entire sensor.

It is a primary objective of the present invention to provide an acceleration sensor that has a simple structure and detects acceleration in an arbitrary direction regardless of the mounting direction.

A further objective of the present invention is to provide an acceleration sensor that has a simple structure and detects an acceleration after dividing it into elements of multiple directions.

SUMMARY OF THE INVENTION

The acceleration sensor according to the present invention includes a case, a circuit board fixed to the case, and a pressure sensitive part fixed to the circuit board provided in the case. The case is filled with a medium that is chiefly constituted by a gel composition. An acceleration selecting element for selecting an acceleration component parallel to the board is provided on the case. The pressure sensitive part detects a pressure generated by an acceleration component parallel to the circuit board, which element is selected by the acceleration selecting element. Accordingly, the present invention enables detecting the pressure generated by an acceleration component parallel to the board, which element is selected from an acceleration of the object by the acceleration selecting element.

DETAILED DESCRIPTION OF THE PREFERRED EMBODIMENTS (First Embodiment)

An acceleration sensor according to a first embodiment of the present invention will now be described with reference to FIG. 1.

Figure 1:
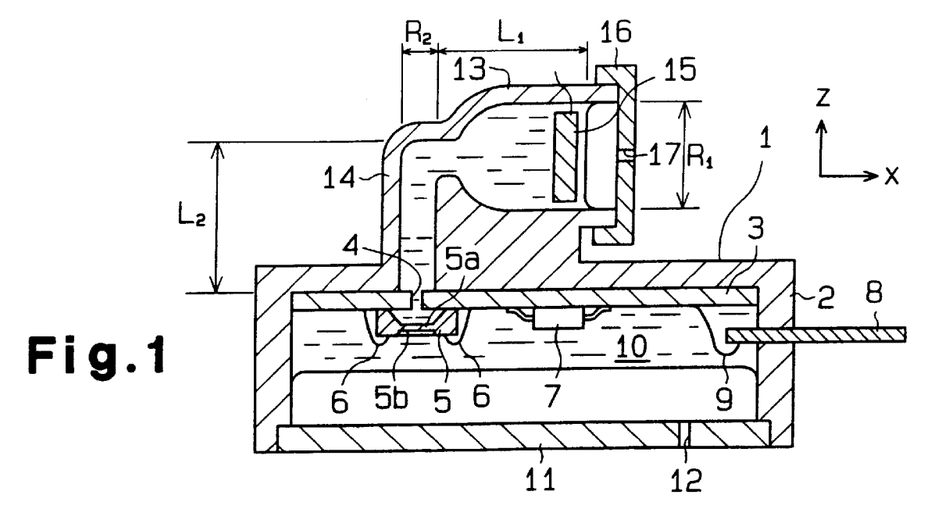
FIG. 1 is a cross-sectional view of a acceleration sensor according to a first embodiment of the present invention.

FIG. 1 is a cross-sectional view of an acceleration sensor 1 according to this embodiment.

The acceleration sensor 1 has a rectangular parallelepiped case 2. A circuit board 3 is fixed in the case 2. The circuit board 3 has a bore 4. A sensor chip 5 as a pressure sensitive part is attached to the bottom surface of the circuit board 3 so as to cover the bore 4. Pressure sensitive part refers to an element that detects pressure applied thereto and converts the pressure into an electrical signal.

The sensor chip 5 is formed on a substrate made of semiconductor material, e.g., a silicon substrate. The top portion of the sensor 5 forms a rectangular parallelepiped and is hollowed out to have a truncated pyramid-shaped recess. The hollowed part forms a thin wall 5a. The sensor chip 5 is generally called a diaphragm type semiconductor pressure sensitive sensor chip of a C-shaped cross section. A diffusion strain gauge 5b is formed on the bottom surface of the thin wall 5a. The diffusion strain gauge 5b detects strain at the thin wall 5a (in other words, pressure applied to the thin wall 5a) and outputs an electrical signal in accordance with the pressure as a detection signal.

The sensor chip 5 is electrically coupled via bonding wires 6 to a printed pattern (not shown) space formed on the circuit board 3. A signal processor 7 incorporated in a common packaging (such as a surface mounting type) is mounted on the circuit board 3. The signal processor 7 is electrically connected via the printed pattern to the sensor chip 5. The signal processor 7 receives a detection signal from the sensor chip 5, amplifies and processes the signal and transmits the signal. External terminals 8 are inserted in the case 2. The external terminals 8 are coupled via bonding wires 9 to the printed pattern on the circuit pattern 3. The detection signal sent from the sensor chip 5 is amplified and processed by the signal processor 7 and sent to the outside of the sensor via the external terminals 8.

The interior of the case 2 is filled with silicon gel 10 consisting of a gel composition. The silicon gel 10 covers the bottom surface of the circuit board 3. In other words, the silicon gel 10 seals the sensor chip 5, the signal processor 7, the printed pattern, the bonding wires 6 and 9 and the external terminals 8.

A lid 11 is fitted to the bottom of the case 2. An air hole 12 is formed in the lid 11.

An acceleration selecting element 13 and a pressure transmitting element 14 are provided on the top surface of the case 2. The acceleration selecting element 13 has a cylindrical shape and placed in such a manner that its center line is directed in a predetermined direction (parallel to the circuit board 3 and the x direction in the figure). The pressure transmitting element 14 has a cylindrical shape with its center line normal to the circuit board 3 (the z direction in the figure). The pressure transmitting element 14 is therefore formed normal to the thin wall 5a of the sensor chip 5. One end of the acceleration selecting element (the left end in the figure) is connected to the pressure transmitting element 14, while the other end (the right end in the figure) opens in the x direction. The center line of the pressure transmitting element 14 is coaxial with the center line of the bore 4 formed in the circuit board 3. The interior of the acceleration selecting element 13 is communicated with the hollowed out part of the sensor chip 5 through the pressure transmitting element 14.

The hollowed out part in the top portion of the sensor chip 5, the pressure transmitting element 14 and the acceleration selecting element 13 are filled with the silicon gel 10. The silicon gel 10 in the acceleration selecting element 13 is exposed in the x direction. A weight 15 is located in the gel 10 in the vicinity of the exposed surface.

The silicon gel 10 and weight 15 in the acceleration selecting element 13 serve as an inertia body to an acceleration applied from the outside. The center line of the acceleration selecting element 13 is directed in the x direction. In other words, when an object to which the acceleration sensor 1 is attached accelerates, the silicon gel 10 in the acceleration selecting element 13 is moved most by the x direction component of the acceleration. The silicon gel 10 and the weight 15 in the acceleration selecting element 13 fluctuate in accordance with the x direction component of the object's acceleration. A pressure is applied to the silicon gel 10 in the pressure transmitting element 14 in accordance with the fluctuation. In other words, the acceleration selecting element 13 selects the x direction component in the acceleration of the object and the acceleration sensor 1 and converts the acceleration component into a pressure. The pressure converted by the acceleration selecting element 13 is transmitted to the sensor chip 5 by the silicon gel 10 filling the pressure transmitting element 14. When pressure is applied to the sensor chip 5, the thin wall 5a of the sensor chip 5 bends and vibrates in response to the pressure. The diffusion strain gauge 5b detects the bending and the vibration of the thin wall 5a and issues an electrical signal corresponding to the bending and the vibration as a detection signal.

The mass of the silicon gel 10 filling the acceleration selecting element 13, the mass of the weight 15 and the inner diameter of the acceleration selecting element 13 are represented by $M_{13}$, $M_{15}$ and $R_1$, respectively. The detection sensitivity Sx for detecting the acceleration component in x direction is proportionate to $(M_3+M_{15})/\{2\pi(R_1/2)^2\}$.

Incidentally, the pressure transmitting element 14 is filled with the silicon gel 10 like the acceleration selecting element 13. The center line of the pressure transmitting element 14 extends in the z direction. Therefore, the silicon gel 10 in the pressure transmitting element 14 is fluctuated by an acceleration component in the z direction. The pressure caused by the fluctuation of the gel 10 is applied to the thin wall 5a of the sensor chip 5. In other words, the thin wall sa of the sensor chip 5 receives the pressure of the fluctuation of the silicon gel 10 filling the acceleration selecting element 13 and the weight 15 caused by an acceleration component in the x direction. The thin wall 5a of the sensor chip 5 also receives the pressure of the fluctuation of the silicon gel 10 filling the pressure transmitting element 14 caused by an acceleration component in the z direction . The mass of the silicon gel 10 filling the pressure transmitting element 14 is represented by $M_{14}$ and the inner diameter of the pressure transmitting element 14 is represented by $R_2$. The detection sensitivity in the z direction Sz is proportionate to $M_{14}/\{2\pi(R_2/2)^2\}$. Therefore, the relationship of the detection sensitivity in the z direction to the detection sensitivity in the x direction Sx is represented by the following formula;

$$Sz/Sx = [M_{14}/\{2\pi(R_2/2)^2\}]/[M_{13}+M_{15})/\{2\pi(R_1/2)^2\}]$$

Setting the detection sensitivity in the x direction Sx high relative to the detection sensitivity in the z direction Sz enables selecting and detecting only an acceleration component in the x direction. Therefore, the configuration of the acceleration selecting element 13 and the pressure transmitting element 14 satisfies the following formula;

$$M_{14}/\{2\pi(R_2/2)^2\} << (M_{13}+M_{15})/\{2\pi(R_1/2)^2\}$$

The right end of the acceleration selecting element 13 is covered with a cap 16 so that dust and debris do not mix with the gel 10. The cap 16 has an air hole 17. The exposed surface of the silicon gel 10 in the acceleration selecting element 13 is exposed to the outer air through the air hole 17.

When an object to which the above acceleration sensor 1 is attached accelerates, the silicon gel 10 filling the acceleration selecting element 13 and the weight 15 are fluctuated by the acceleration component in the x direction of the object and the acceleration sensor 1. The acceleration in the x direction is converted into pressure corresponding to the acceleration in the x direction by the silicon gel 10 and the weight 15 in the acceleration selecting element 13. The pressure is transmitted to the sensor chip 5 via the silicon gel 10 in the pressure transmitting element.

The thin wall 5a of the sensor chip 5, when receiving pressure, bends and vibrates in accordance with the received pressure. The diffusion strain gauge 5b formed on the wall 5a detects the bending and vibration of the thin wall 5a and issues an electrical signal in accordance with the strain caused by the bending and vibration (i.e., pressure applied to the thin wall 5a) as a detection signal. The detection signal from the diffusion strain gauge 5b reflects only the acceleration component of the direction selected by the acceleration selecting element, namely the x direction, among the acceleration of the object and the acceleration sensor 1. The detection signal from the sensor chip 5 is amplified and processed by the signal processor 7 and transmitted to the outside of the sensor.

As described above, in this embodiment, the acceleration selecting element 13 is provided in the case 2. The acceleration selecting element 13 selects the acceleration component in the x direction of an acceleration of the object to which the acceleration sensor 1 is attached. The pressure corresponding to the selected acceleration component is transmitted to the sensor chip 5 via the acceleration transmitting element 14 formed normal to the thin wall 5a of the sensor chip 5. The detection signal transmitted to the pressure is outputted from the sensor chip 5.

As a result, a simple structure enables detecting an acceleration in an arbitrary direction regardless of the mounting direction of the sensor chip 5 since the direction of the sensor chip 5 does not have to be oriented in the same direction as the acceleration to be detected.

Furthermore, setting the centerline of the acceleration selecting element 13 in a certain direction enables detecting the acceleration component in the set direction.

(Second Embodiment)

Figure 3:
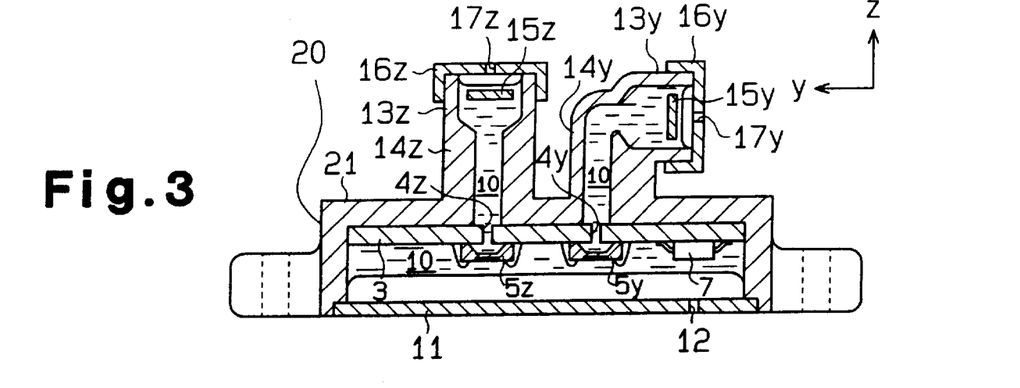
FIG. 3 is a cross-sectional view taken along line 3—3 of FIG. 2.
Figure 4:
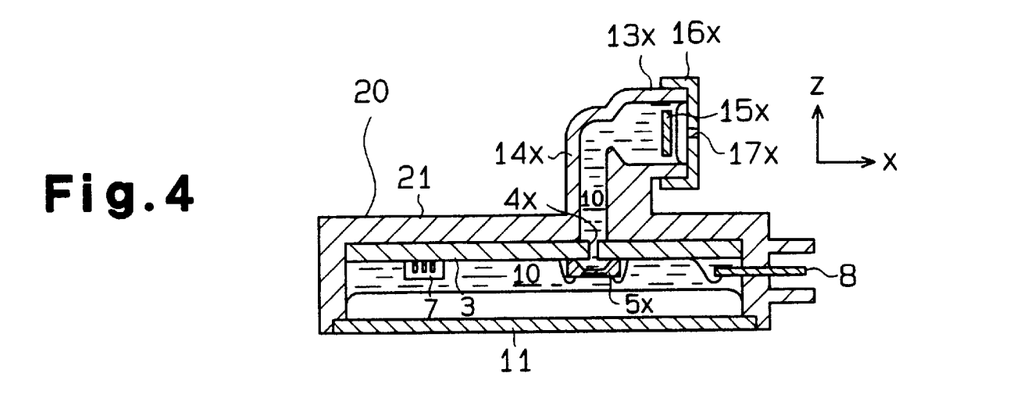
FIG. 4 is a cross-sectional view taken along line 4—4 of FIG. 2.

A three dimensional acceleration sensor according to a second embodiment of the present invention will now be described with reference to FIGS. 2 to 4.

To avoid a redundant description, like or same reference numerals in the first embodiment are given to corresponding parts of this embodiment.

Figure 2:
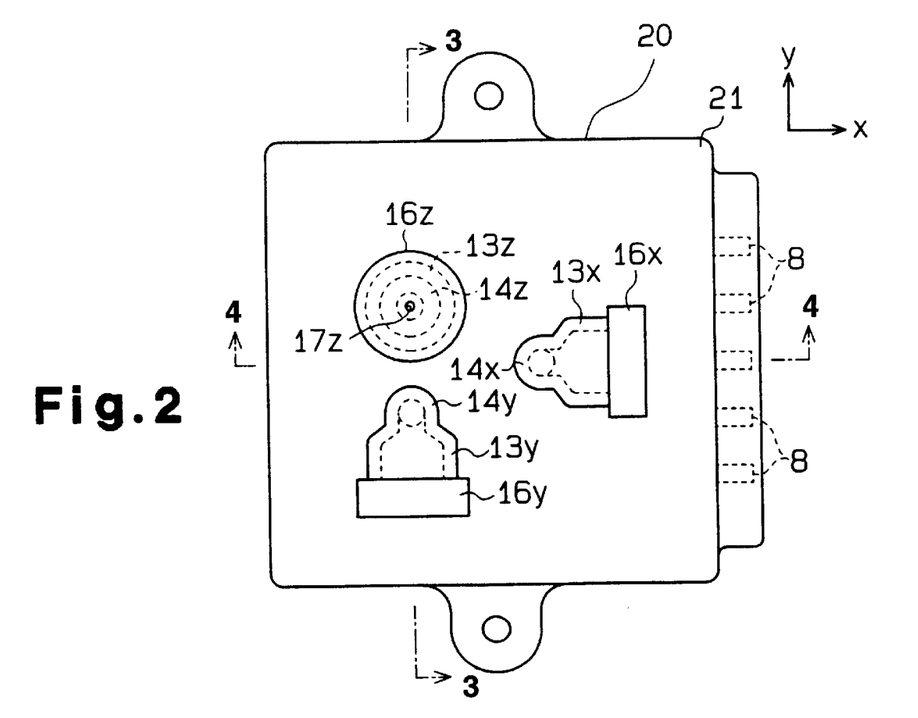
FIG. 2 is a plan view of an acceleration sensor according to a second embodiment of the present invention.

FIG. 2 is a plan view of a three dimensional acceleration sensor according to a second embodiment of the present invention. FIG. 3 is a cross-sectional view taken along line 3—3 of FIG. 2. FIG. 4 is a cross-sectional view taken along line 4—4 of FIG. 2.

A three dimensional acceleration sensor 20 includes a circuit board 3 having bores 4x to 4z. Sensor chips 5x to 5z are mounted on the bottom surface of the circuit board 3 so as to cover the bores 4x to 4z, respectively.

A case 21 of the three dimensional acceleration sensor 20 has acceleration selecting elements 13x, 13y and 13z, which are formed cylindrically like the acceleration selecting element in the first embodiment. The center line of the acceleration selecting element 13x is parallel to the circuit board 3 (i.e., the x direction in FIGS. 2 and 4). The center line of the acceleration selecting element 13y is parallel to the circuit board 3 (i.e., the y direction in FIGS. 2 and 3). The centerline of the acceleration selecting element 13z is normal to the circuit board 3 (i.e., the z direction in FIGS. 3 and 4).

The case 21 also has pressure transmitting elements 14x to 14z. The pressure transmitting elements 14x to 14z are each formed cylindrical and normal to the circuit board 3. The pressure transmitting elements 14x to 14z are each formed normal to the sensor chips 5x to 5z, respectively.

The pressure transmitting elements 14x to 14z are connected to the acceleration selecting elements 13x to 13z, respectively. The interiors of the acceleration selecting elements 13x to 13z is communicated with the hollowed parts of the sensor chips 5x to 5z via the pressure transmitting elements 14x to 14z, respectively. The hollowed parts of the sensor chips 5x to 5z, the acceleration selecting elements 13x to 13z and the pressure transmitting elements 14x to 14z are each filled with the silicon gel 10. Weights 15x to 15z are located in the silicon gel 10 filling each of the acceleration selecting elements 13x to 13z as in the first embodiment.

The x direction acceleration component in an acceleration of an object to which the three dimensional acceleration sensor 20 is attached is selected by the acceleration selecting element 13x and converted into a pressure corresponding to the x-direction acceleration component. The converted pressure is transmitted to the sensor chip 5x by the silicon gel 10 filling the pressure transmitting element 14x. The sensor chip 5x then transmits a detection signal corresponding to the transmitted pressure, that is, the x direction acceleration component.

Likewise, the y direction acceleration component is selected by the acceleration selecting element 13y and converted into a pressure corresponding to the y direction acceleration component. The converted pressure is transmitted to the sensor chip 5y by the silicon gel 10 filling the pressure transmitting element 14y. The sensor chip 5y issues a detection signal corresponding to the transmitted pressure, that is, the y direction acceleration component.

The z-direction acceleration component is selected by the acceleration selecting element 13z and converted into a pressure corresponding to the z direction acceleration component. The converted pressure is transmitted to the sensor chip 5z by the silicon gel 10 filling the pressure transmitting element 14z. The sensor chip 5z transmits a detection signal corresponding to the transmitted pressure, that is, the z direction acceleration component.

The acceleration selecting elements 13x to 13z are each covered with caps 16x to 16z so that dust and debris do not mix with the gel 10. Air holes 17x to 17z are formed in the caps 16x to 16z, respectively.

When an object to which the above three dimensional acceleration sensor 20 is attached accelerates, the acceleration selecting element 13x selects the x direction acceleration component of the acceleration and converts it into a pressure. The acceleration selecting element 13y selects the y direction acceleration component in the acceleration and converts it into a pressure. The acceleration selecting element 13z selects the z direction acceleration component in the acceleration and converts it into a pressure.

The converted pressures corresponding to the selected acceleration components are transmitted to the sensor chips 5x to 5z via the pressure transmitting elements 14x to 14z, respectively. The sensor chips 5x to 5z detect the pressures and issue detection signals corresponding to the pressures, respectively. The signal processor 7 amplifies and processes the detection signals and sends them to the outside of the sensor. The acceleration components of the x, y and z directions are detected separately and a detection signal corresponding to each acceleration component is produced.

As described above, in this embodiment, the acceleration selecting elements 13x to 13z are provided for separately selecting acceleration components of the x, y and z directions. The sensor chips 5x to 5z are provided for detecting pressures converted from the selected acceleration components and producing the detection signals.

As a result, the detection signals, each corresponding to one of the acceleration components of the x, y and z directions, are produced. This enables separating and detecting a multi-dimensional acceleration by a simple structure.

The sensor chips 5x to 5z do not have to be oriented in x, y and z directions, respectively, to detect the corresponding acceleration components. The mounting of the sensor is thus facilitated. The sensor chips 5x to 5z are mounted on the same circuit board 3. This simplifies the structure of the sensor and reduces the manufacturing cost.

(Third Embodiment)

A third embodiment of the present invention will now be described with reference to FIG. 5.

To avoid a redundant description, like or same reference numerals in the first embodiment are given to corresponding parts of this embodiment.

Figure 5:
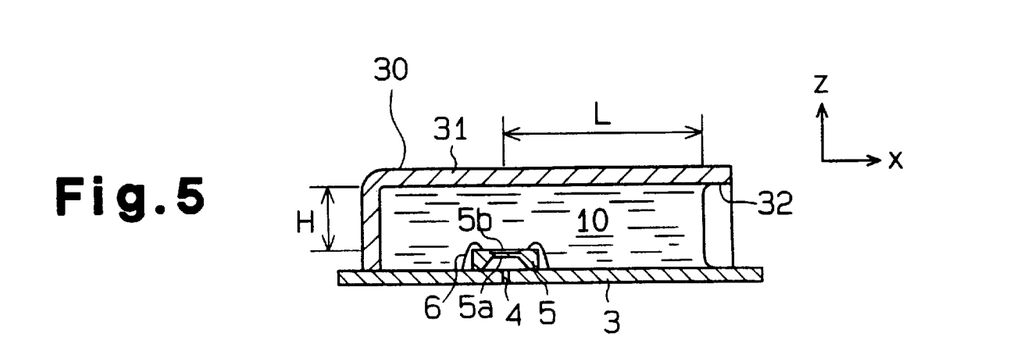
FIG. 5 is a cross-sectional view of an acceleration sensor according to the third embodiment of the present invention.

FIG. 5 is a cross-sectional view illustrating an acceleration sensor 30 according to this embodiment.

The acceleration sensor 30 has a circuit board 3. A bore 4 is formed in the circuit board 3. A sensor chip 5 is mounted on the top surface of the circuit board 3 so as to cover the bore 4. An acceleration selecting element 31 is provided on the circuit board 3.

The acceleration selecting element 31 covers the sensor chip 5 and extends parallel to the circuit board 3 (the x direction in FIG. 5). The acceleration selecting element 31 has a certain height H from the sensor chip 5. An opening 32 is formed at the right end of the acceleration selecting element 31. The acceleration selecting element 31 serves as a case and is filled with the silicon gel 10. The surface of the silicon gel 10 is exposed to the x-direction. The distance L from the sensor chip 5 to the exposed surface of the silicon gel 10 is longer than the height H.

Figure 6:
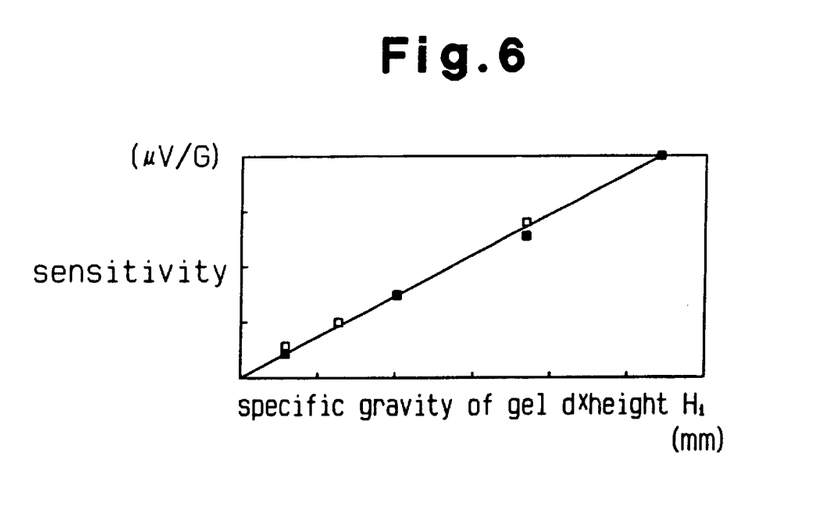
FIG. 6 is a graph showing the characteristics of a conventional acceleration sensor.

Experiments have revealed that the detection sensitivity of the conventional acceleration sensor 70 shown in FIG. 16 for detecting an acceleration applied to the acceleration sensor 70 (z direction) is proportionate to the product of the specific gravity d of the silicon gel 75 filling the sensor mount 72 and the height of the filling silicon gel 75 $H_1$.

Figure 7:
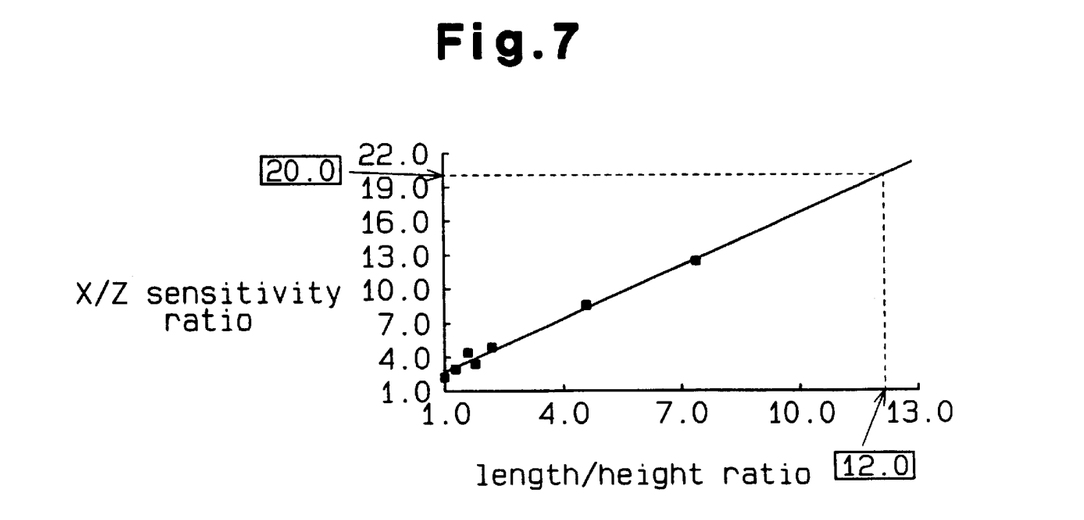
FIG. 7 is a graph showing the characteristics of an acceleration sensor according to a third embodiment of the present invention.

FIG. 7 is a graph showing the relation between the ratio of the length L of the acceleration sensor 30 to its height H (length/height ratio) and the ratio of the measured sensitivity of the acceleration component in the x direction to the measured sensitivity of the acceleration component in the z direction (x/z sensitivity ratio). This graph shows that the x/z sensitivity ratio is in direct proportion to the length/height ratio and also that the x/z sensitivity ratio is increased by increasing the length/height ratio. Extending the length L relative to the height H enhances the detection sensitivity in the x direction relative to the detection sensitivity in the z direction. Consequently, the acceleration sensor 30 selectively detects the x-direction acceleration component. The length L is long relative to the height H in this embodiment.

When an object to which the above acceleration sensor is attached accelerates, the acceleration selecting element 31 selects the acceleration component parallel to the circuit board 3, that is, the x direction acceleration component. The x direction acceleration component is converted into a pressure. The pressure is transmitted to the sensor chip 5 via the silicon gel 10. The sensor chip 5 receives the pressure from the silicon gel 10 and transmits a detection signal corresponding to the pressure.

As described above, the acceleration selecting element 31 extending in the x direction is provided. The acceleration selecting element 31 is formed in such a manner that the detective sensitivity of the sensor chip 5 in the x direction, which is parallel to the circuit board 3, is enhanced. As in the above embodiments, the device of this embodiment eliminates the necessity for altering the direction of the sensor chip 5 to match the direction of an acceleration to be detected.

In contrast to the first and second embodiments, the x direction acceleration component selected by the acceleration selecting element 31 is directly transmitted to the sensor chip 5. The pressure transmitting element 14 is therefore unnecessary in this embodiment. This enables detecting an acceleration component in an arbitrary direction with a simpler structure.

(Fourth Embodiment)

Figure 9:
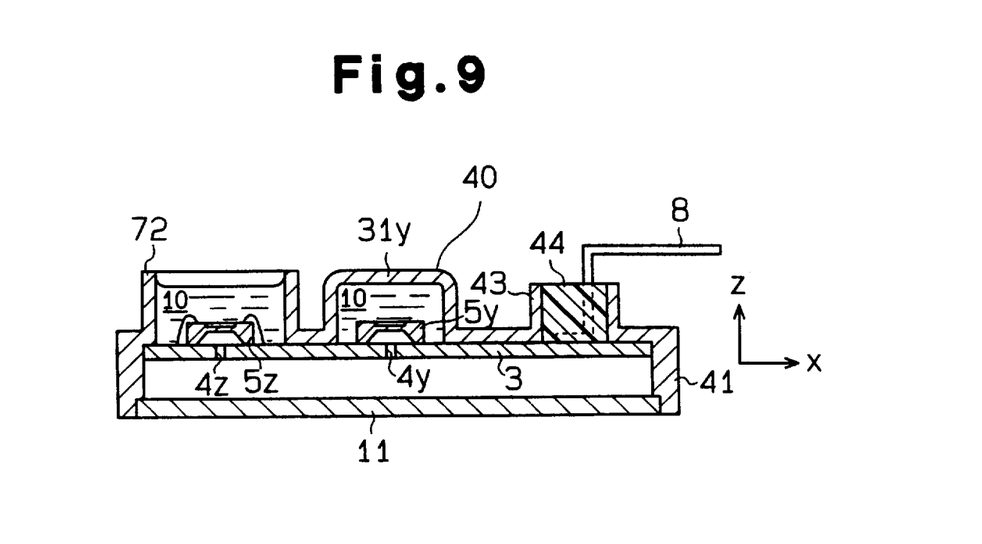
FIG. 9 is a cross-sectional view taken along line 9—9 of FIG. 8.
Figure 10:
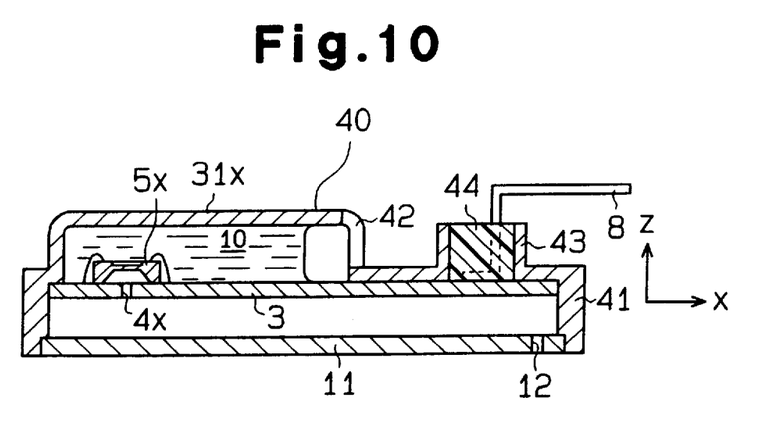
FIG. 10 is a cross-sectional view taken along line 10—10 of FIG. 8.

A three dimensional acceleration sensor according to a fourth embodiment of the present invention will now be described with reference to FIGS. 8 to 10.

To avoid a redundant description, like or same reference numerals of the third embodiment or FIG. 16 are given to corresponding parts of this embodiment.

Figure 8:
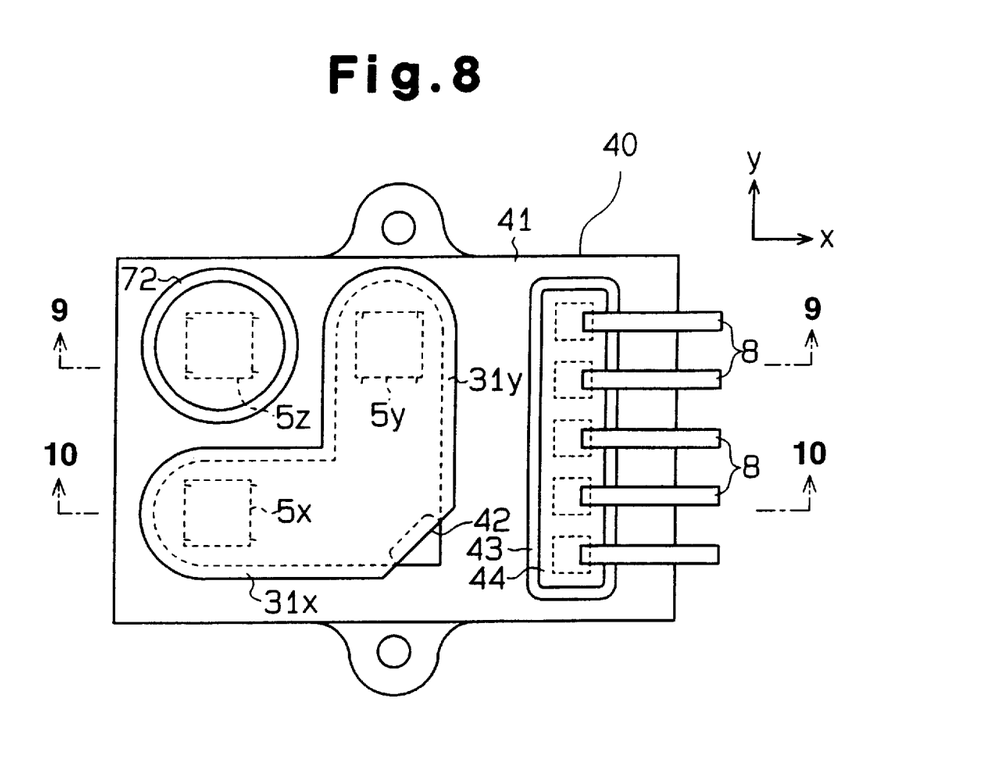
FIG. 8 is a plan view of an acceleration sensor according to a fourth embodiment of the present invention.

FIG. 8 is a plan view illustrating a three dimensional acceleration sensor 40 according to this embodiment. FIG. 9 is a cross-sectional view taken along line 9—9 of FIG. 8. FIG. 10 is a cross-sectional view taken along line 10—10 of FIG. 8.

The three dimensional accelerator 40 has a circuit board 3. As in the second embodiment, bores $4x$ to $4z$ are formed in the circuit board 3. Sensor chips $5x$ to $5z$ are provided on the top surface of the circuit board 3 so as to cover the bores $4x$ to $4z$, respectively.

The three dimensional acceleration sensor 40 has a case 41. A first acceleration selecting element $31x$ is formed on the case 41. The acceleration selecting element $31x$ is formed to cover the sensor chip $5x$. The acceleration selecting element $31x$ extends parallel to the circuit board 3 (the x direction in FIGS. 8 and 10).

A second acceleration selecting element $31y$ is formed on the case 41. The acceleration selecting element $31y$ is formed so as to cover the sensor chip $5y$. The acceleration selecting element $31y$ extends parallel to the circuit board 3 (the y direction in FIGS. 8 and 9) and normal to the acceleration selecting element $31x$.

The acceleration selecting elements $31x$ and $31y$ are connected. An opening 42 is formed diagonally at the connecting part. Silicon gel 10 is filled into the acceleration selecting elements $31x$ and $31y$ through the opening 42.

As in the conventional sensor shown in FIG. 16, the case 41 has a cylindrical sensor mount 72 surrounding a sensor chip $5z$. The sensor mount 72 is filled with silicon gel 10. The silicon gel 10 transmits to the sensor chip $5z$ a pressure generated when the gel 10 is fluctuated by a z direction acceleration component of the acceleration of the object and the three dimensional sensor 40 to which it is attached. In other words, the sensor mount 72 serves as a third acceleration selecting element for selecting the z direction acceleration component.

The acceleration selecting elements $31x$ and $31y$, as described in the third embodiment, select the acceleration components in the x direction and the y direction, respectively. In other words, the acceleration selecting element $31x$ selects the x direction acceleration component, while the acceleration selecting element $31y$ selects the y direction component. And, as in the conventional acceleration sensor, the sensor mount 72 selects the z direction acceleration component.

The pressures corresponding to the selected components are transmitted to the sensor chips $5x$ to $5z$, respectively. The sensor chips $5x$ to $5z$ detect the pressures, respectively, and issue detection signals corresponding to each pressure. The signal processor 7 amplifies and processes the detection signals and sends them to the outside of the sensor. Acceleration components of the x, y and z directions are therefore detected separately and detection signals corresponding to each direction are produced.

The case 41 has a housing 43 surrounding the external terminals 8 electrically connected to the circuit board 3. The housing 43 is filled with sealing material 44, which prevents the external terminals 8 from flaking off the circuit board 3.

As described above, as in the second embodiment, a simple structure allows a multi-directional acceleration to be separated and detected in this embodiment. Furthermore, the sensor chips $5x$ to $5z$ do not have to be mounted to point x, y and z directions to match the directions of the corresponding acceleration components. This reduces the manufacturing cost.

(Fifth Embodiment)

A three dimensional accelerometer sensor according to a fifth embodiment of the present invention will now be described with reference to FIGS. 11 to 12.

To avoid a redundant description, like or same reference numerals of the fourth embodiment are given to corresponding parts of this embodiment.

Figure 11:
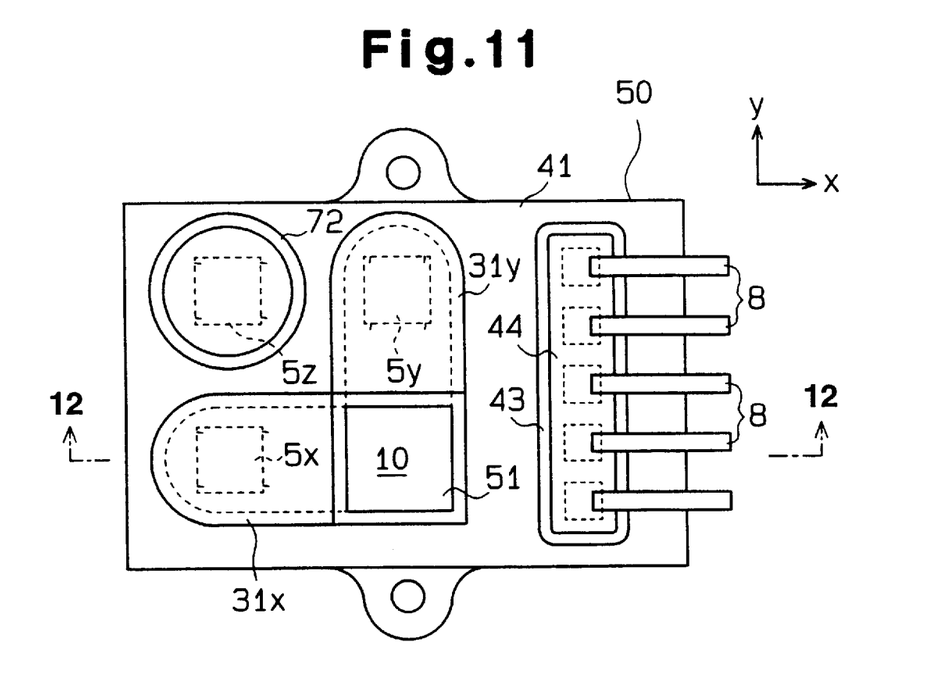
FIG. 11 is a plan view of an acceleration sensor according to a fifth embodiment of the present invention.
Figure 12:
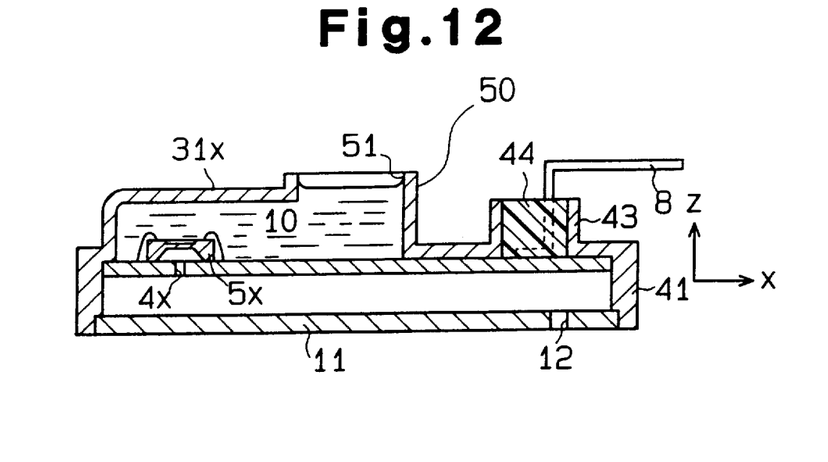
FIG. 12 is a cross-sectional view taken along line 12—12 of FIG. 11.

FIG. 11 is a plan view illustrating a three dimensional acceleration sensor 50 according to this embodiment. FIG. 12 is a cross-sectional view taken along line 12—12 of FIG. 11.

This embodiment is different from the fourth embodiment only by the configuration of the acceleration selecting elements $31x$ and $31y$. The acceleration selecting elements $31x$ and $31y$ are connected vertically to each other as in the fourth embodiment. The connection portion opens in the z-direction to form an opening 51. The sensor mount 72 opens in the x-direction. The opening 51 therefore opens in the same direction as the sensor mount 72. In the fourth embodiment, when filling the acceleration selecting elements $31x$ and $31y$ with the silicon gel, the three dimensional sensor 40 must be held vertically so that the opening 41 is pointed upward. This means that the orientation of the three dimensional sensor 40 should be different when filling the acceleration selecting element $31x$ and $31y$ from the orientation for filling the sensor mount 72 with the silicon gel 10. However, in the three dimensional acceleration sensor 50 according this embodiment, the opening 51 opens in the same direction as the sensor mount 72. This allows the three dimensional acceleration sensor 50 to be filled with the silicon gel 10 without changing its orientation. Manufacturing of the acceleration 50 is thus facilitated.

(Sixth Embodiment)

Figure 14:
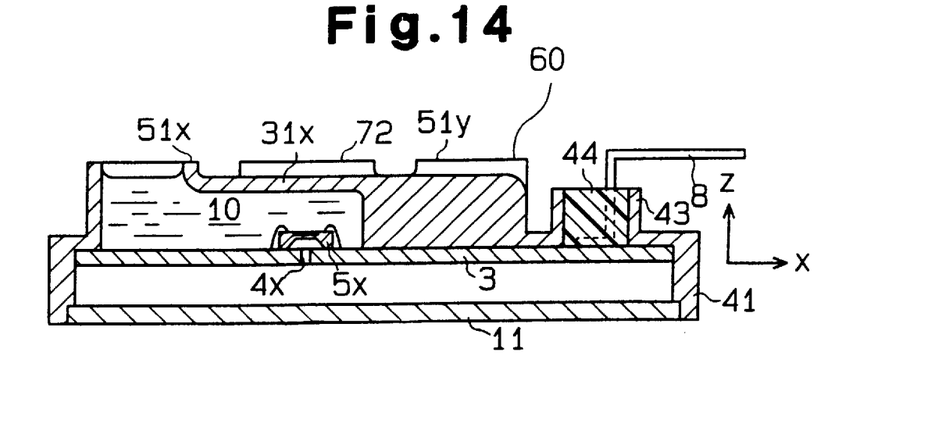
FIG. 14 is a cross-sectional view taken along line 14—14 of FIG. 13.
Figure 15:
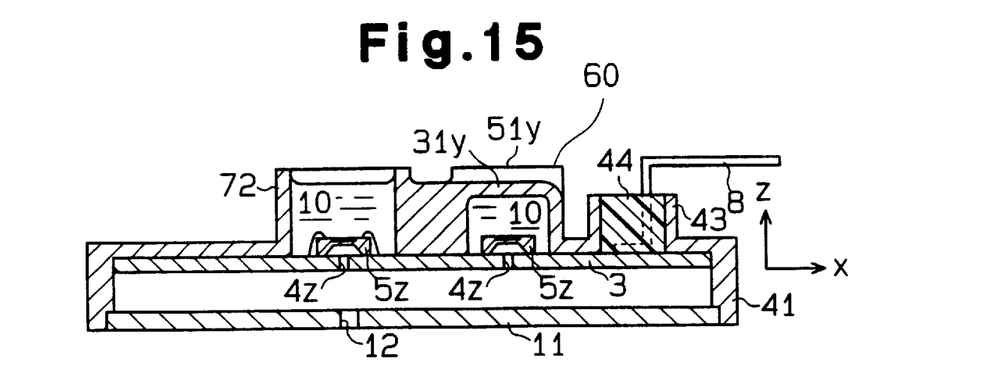
FIG. 15 is a cross-sectional view taken along line 15—15 of FIG. 13.

A three dimensional accelerometer sensor according to a sixth embodiment of the present invention will now be described with reference to FIGS. 13 to 15.

To avoid a redundant description, like or same reference numerals of the fourth and fifth embodiments are given to corresponding components of this embodiment.

Figure 13:
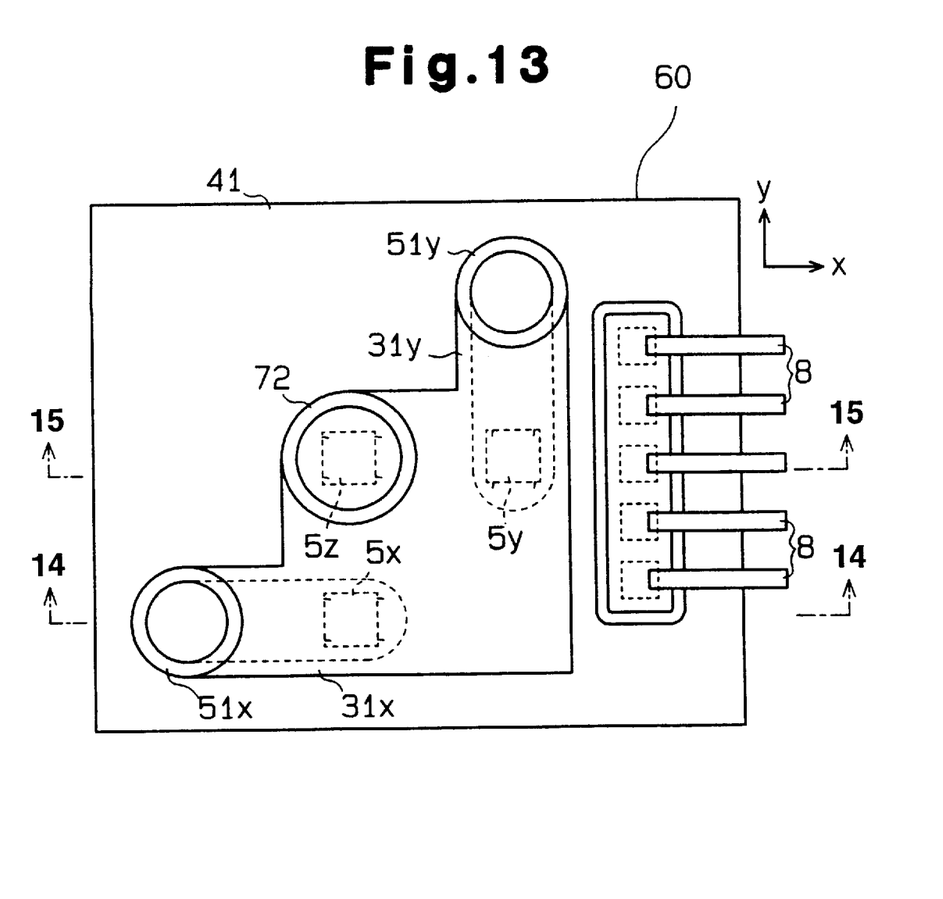
FIG. 13 is a plan view of an acceleration sensor according to a sixth embodiment of the present invention.

FIG. 13 is a plan view illustrating a three dimensional acceleration sensor 60 according to this embodiment. FIG. 14 is a cross-sectional view taken along line 14—14 of FIG. 13. FIG. 15 is a cross-sectional view taken along line 15—15 of FIG. 13. Unlike in the fourth and fifth embodiments, the acceleration selecting elements 31x and 31y of the three dimensional acceleration sensor 60 are formed separately. The acceleration selecting elements 31x and 31y have openings 51x and 51y, respectively. The openings 51x and 51y open in the z direction, facilitating the filling of the silicon gel 10 in the acceleration selecting elements 31x and 31y. This facilitates, as in the fifth embodiment, filling of the silicon gel 10 in the acceleration selecting elements 31x and 31y and the sensor mount 72 when manufacturing the three dimensional acceleration sensor 60. The manufacturing of the acceleration sensor 60 is thus simplified.

Further, the detection sensitivities in the x and y directions are easily changed by changing the lengths of the acceleration selecting elements 31x and 31y or changing the mass of the silicon gel 10 filling the acceleration selecting elements 31x and 31y.

Although only a few embodiments of the present invention have been described so far, it should be apparent to those skilled in the art that the present invention may be embodied in many other specific forms without departing from the spirit or scope of the invention. Particularly, the invention may be embodied in the following forms:

In the above embodiments, the mass of the silicon gel 10 may be changed by diffusing particles having appropriate mass in the gel 10. The particles may be of metal, ceramic and synthetic resin. Accordingly, the detection sensitivity of the acceleration sensors 1, 20, 30, 40, 50 and 60 may be adjusted.

In the first and second embodiments, the weights 15, 15x to 15z may be omitted. On the other hand, a weight may be provided in the third to sixth embodiments.

In the first and second embodiments, the sensor chips 5 and 5x to 5z may be provided on the top surface of the circuit board 3. In the third to sixth embodiments, the cell chips 5 and 5x to 5z may be provided on the bottom surface of the circuit board 3.

In the above embodiments, the acceleration selecting elements 13, 13x to 13z, 31x and 31y may extend in arbitrary directions. The structure enables detecting the acceleration component in an arbitrary direction.

In the above embodiments, the sensor chip may have any shape as long as it is of a diaphragm type. For example, sensor chips having an E shaped cross section may be used. Further, other than a diaphragm type semiconductor, pressure sensors having a C shaped cross section, diaphragm type sensor chips utilizing thin film gauges and diaphragm type capacitive pressure sensitive sensor chips may be utilized.

In the above embodiments, the acceleration transmitting medium may include any gel material including high molecular gel chiefly constituted by a material selected from the group consisting of, other than silicon gel, polyvinyl alcohol, polyurethane, polyether and polyester. The medium may also be constituted by acrylic acid derivative.

In the above embodiments, the weights 15 and 15x to 15z may be constituted by metal such as copper, brass or iron, gel mixed with metal particles or rubber.

Therefore, the present examples and embodiments are to be considered as illustrative and not restrictive and the invention is not to be limited to the details given herein, but may be modified within the scope of the appended claims.

We claim:

1. An acceleration sensor comprising;

a case;

a generally planar circuit board located in said case;

a first pressure sensitive part mounted on said circuit board;

a first acceleration selecting element having an interior chamber formed to extend parallel to the plane of said circuit board, said first acceleration selecting element having a opening communicating its interior chamber to the outside;

a medium substantially filling said interior chamber and contacting said pressure sensitive part, said medium consisting essentially of a gel like composition; and wherein said acceleration sensor detects a component of acceleration in a direction parallel to the plane of the circuit board of an acceleration of an object to which said acceleration sensor is attached.

2. The acceleration sensor of claim 1 further comprising a pressure transmitting element, said pressure transmitting element having an interior chamber extending in a direction perpendicular to the plane of said circuit board, said interior chamber of said pressure transmitting element being filled with said medium.

3. The acceleration sensor according to claim 1 further comprising:

a second acceleration selecting element formed in said case, said second acceleration selecting element having an interior chamber extending parallel to the plane of said circuit board and perpendicular to the extending direction of the interior chamber of said first acceleration selecting element, said second acceleration selecting element having an opening for communicating its interior chamber to the outside;

a second pressure sensitive part mounted on said circuit board;

wherein said medium substantially fills the interior chamber of said second acceleration selecting element and contacts the second pressure sensitive part;

a third acceleration selecting element formed in said case, said third acceleration selecting element having an interior chamber extending in a direction perpendicular to the plane of said circuit board, said third acceleration selecting element having an opening for communicating its interior chamber to the outside;

a third pressure sensitive part mounted on said-circuit board; and wherein said medium substantially fills said third acceleration selecting element and contacts said third pressure sensitive part.

4. The acceleration sensor according to claim 3 further comprising;

a first pressure transmitting element having an interior chamber extending in a direction perpendicular to the plane of said circuit board for connecting said first pressure sensitive part and the interior chamber of said first acceleration selecting element, wherein said medium fills said first pressure transmitting element;

a second pressure transmitting element having an interior chamber extending in a direction perpendicular to the plane of said circuit board for connecting said second pressure sensitive part and the interior chamber of said second acceleration selecting element, wherein said medium fills said second pressure transmitting element.

5. The acceleration sensor according to claim 4 wherein the interior chambers of each of said first, second and third acceleration selecting elements has a cylindrical shape, and further, each of the interior chambers of said first and second pressure transmitting elements has a cylindrical shape.

6. The acceleration sensor according to claim 3 wherein at least one of said first, second and third acceleration selecting elements incorporates a weight in the medium therein.

7. An acceleration sensor comprising;
a generally planar circuit board;
a first pressure sensitive part mounted on said circuit board;
a first acceleration selecting element having an interior chamber extending in a direction parallel to the plane of said circuit board, said first acceleration selecting element, together with said circuit board, forming a case accommodating said first pressure sensitive part, said first acceleration selecting element having an opening for communicating its interior chamber to the outside;
a medium substantially filling the interior chamber of said acceleration selecting element, said medium consisting essentially of a gel composition; and
wherein said acceleration sensor detects a component of acceleration in a direction parallel to the plane of the circuit board of an acceleration of an object to which said acceleration sensor is attached.

8. The acceleration sensor according to claim 7 further comprising;
a second pressure sensitive part mounted on said. circuit board;
a second acceleration selecting element having an interior chamber extending parallel to said circuit board and perpendicular to the extending direction of the interior chamber of said first acceleration selecting element, said second acceleration selecting element, together with said circuit board, forming a case for accommodating said second pressure sensitive part, said second acceleration selecting element having an opening for communicating its interior chamber to the outside, wherein said medium substantially fills said second acceleration selecting element;
a third pressure sensitive part mounted on said circuit board;
a third acceleration selecting element having an interior chamber extending perpendicular to said circuit board, said third acceleration selecting element, together with said circuit board, forming a case for accommodating said third pressure sensitive part, said third acceleration selecting element having an opening for communicating its interior chamber to the outside, wherein said medium substantially fills the interior chamber of said third acceleration selecting element.

9. The acceleration sensor according to claim 8 wherein each of said openings of said first and second acceleration selecting elements faces a direction perpendicular to the plane of said circuit board.

10. The acceleration sensor according to claim 8 wherein the interior chambers of said first and second acceleration selecting elements are connected to each other at a connecting part, and a common opening is formed at the connecting part.

11. The acceleration sensor according to claim 10 wherein said common opening of said first and second acceleration selecting elements faces in a direction perpendicular to the plane of said circuit board.

12. The acceleration sensor according to claim 7 wherein:
said first acceleration selecting element has an inner wall located opposite to said first pressure sensitive part, and said inner wall is located at a height H from said first pressure sensitive part as measured in a direction perpendicular to the plane of the circuit board;
wherein said medium forms an interface with the atmosphere near said opening in said first acceleration selecting element, and said interface is spaced from said first pressure sensitive part by a length L as measured in a direction parallel to the plane of the circuit board; and
wherein said pressure sensitive part is positioned on said circuit board such that the length L is longer than the height H.

13. An acceleration sensor comprising;
a generally planar circuit board;
a first pressure sensitive part mounted on said circuit board, said first pressure sensitive part having a generally planar thin wall portion that is sensitive to pressure changes, and wherein the plane of the thin wall portion is arranged to be parallel to the plane of the circuit board;
a first acceleration selecting element having an interior chamber formed to extend parallel to the plane of said circuit board, said first acceleration selecting element having an opening communicating its interior chamber to the outside;
a medium substantially filling said interior chamber and contacting said thin wall portion, said medium consisting essentially of a gel like composition; and
wherein said acceleration sensor detects a component of acceleration in a direction parallel to the plane of the circuit board of an acceleration of an object to which said acceleration sensor is attached.

* * * * *